United States Patent [19]
Gulick

[11] Patent Number: 5,838,865
[45] Date of Patent: Nov. 17, 1998

[54] FIBER OPTIC LIGHT HOMOGENIZER FOR USE IN PROJECTION DISPLAYS

[75] Inventor: Paul E. Gulick, Tualatin, Oreg.

[73] Assignee: Clarity Visual Systems, Inc., Wilsonville, Oreg.

[21] Appl. No.: 870,094

[22] Filed: Jun. 5, 1997

[51] Int. Cl.⁶ ..................................................... G02B 6/04
[52] U.S. Cl. .............................. 385/121; 385/116; 362/32
[58] Field of Search ................................... 385/121, 120, 385/115, 116; 362/32

[56] References Cited

U.S. PATENT DOCUMENTS

| | | | |
|---|---|---|---|
| 4,101,188 | 7/1978 | Yevick | 350/96.24 |
| 4,839,635 | 6/1989 | Harris et al. | 340/752 |
| 5,150,445 | 9/1992 | Toyoda et al. | 385/116 |
| 5,428,365 | 6/1995 | Harris et al. | 345/55 |
| 5,465,315 | 11/1995 | Sakai et al. | 385/116 |
| 5,715,345 | 3/1998 | McKinley | 385/115 |

OTHER PUBLICATIONS

"Light Tunnel Illumination Apparatus", IBM Technical Disclosure Bulletin, vol. 27, No. 10B, US, Mar. 1985, pp. 1–3 (6225 and 6226).

*Primary Examiner*—Phan T. H. Palmer
*Attorney, Agent, or Firm*—Stoel Rives LLP

[57] ABSTRACT

A projection display (12) employs a fiber optic homogenizer (32) that includes a bundle (60) of optical fibers arranged such that an input end (64) has a substantially round cross-sectional shape that receives nonuniform illumination generated by a projection light source (24,26). The fiber optic homogenizer contains optical fibers that are interwoven and rerouted through the length of the bundle to terminate in an output end (66) having the same shape as a light valve (40) that generates the image projected by the display. The interweaving and rerouting provides a substantially random redistribution of fibers across the shape of the output end to propagate a uniform, rectangular illumination beam onto the light valve with very little light loss. A multiscreen projection display (70) further matches the luminance and color of adjacent projection displays (86) by employing a single projection light source (24,26) and a fiber optic homogenizer (72) that has an input end shaped and arranged as before, but with a bundle (74) further subdivided into subbundles (76) each terminating in an output end (78) having a shape matched to a light valve (80) in an associated one of the projection displays. The optical fibers are interwoven and routed to provide a subdivision and random redistribution of the fibers across the rectangular cross-sectional shape of each of the output ends.

27 Claims, 4 Drawing Sheets

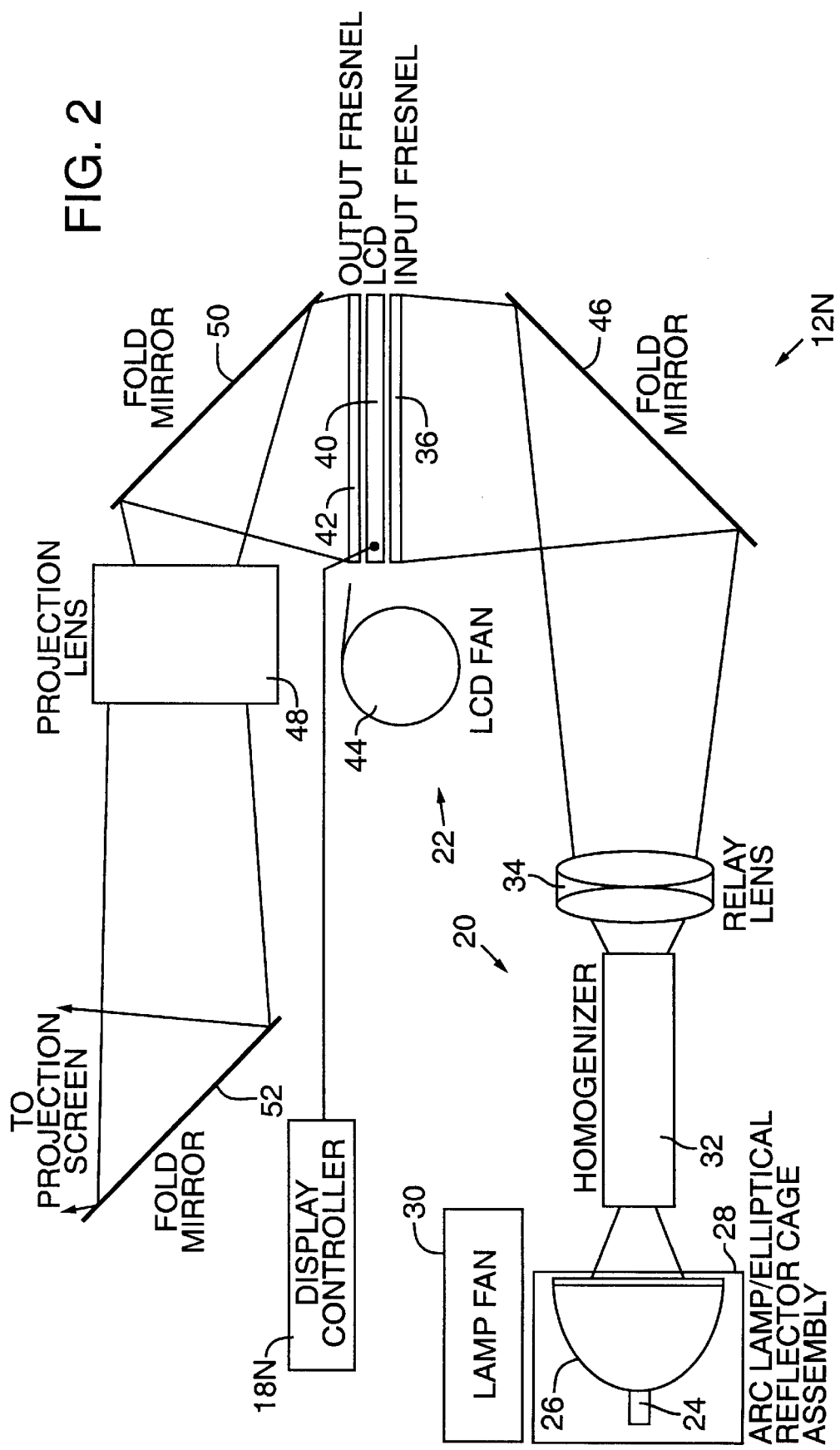

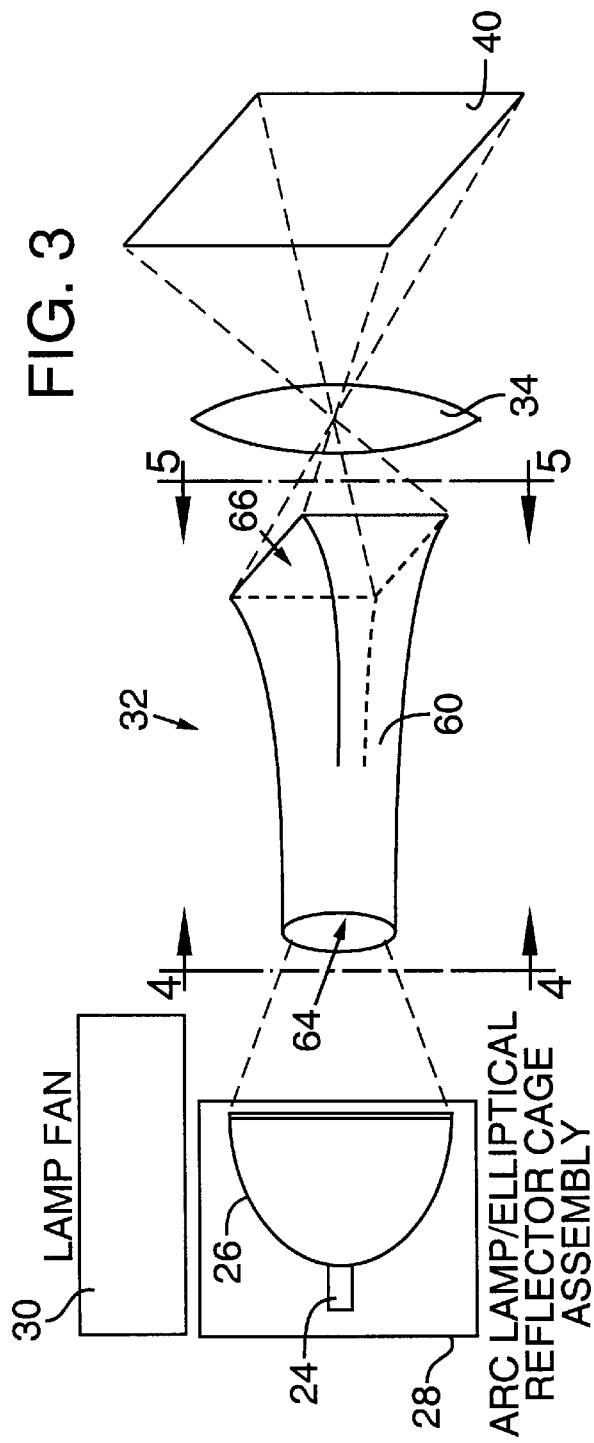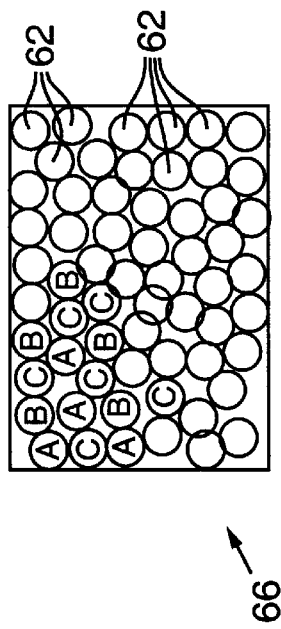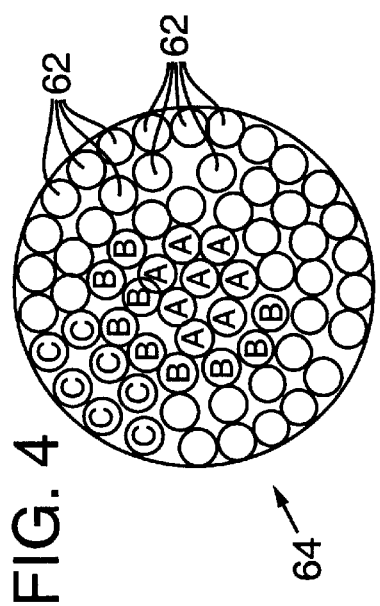

FIBER OPTIC LIGHT HOMOGENIZER FOR USE IN PROJECTION DISPLAYS

RELATED APPLICATIONS

Not Applicable

FEDERALLY SPONSORED RESEARCH OR DEVELOPMENT

Not Applicable

TECHNICAL FIELD

This invention relates to video display devices and more particularly to a light source homigenizer that provides improved luminance, luminance uniformity, and color uniformity in light valve projection displays and facilitates their use in multiscreen applications.

BACKGROUND OF THE INVENTION

There are previously known large area, thin, flat panel displays employing various technologies to achieve large display screen dimensions, e.g., greater than about 40 diagonal inches, combined with narrow screen thicknesses, e.g., less than about eight inches. Such technologies do not, therefore include cathode-ray tube ("CRT") displays, but do include liquid crystal, plasma, and field emission displays employed in single and multiscreen arrangements. Problems with large diagonal size single display arrangements are the costs, handling difficulties, complicated manufacturing processes, and inherent low yields associated with the large substrates required. Problems with multiscreen arrangements include poor luminance, poor luminance and color uniformity, difficulties achieving visually seamless display boundaries, and high costs associated with the redundancy inherent in multiscreen displays. Projection displays offer potential solutions to some of these problems, but have their own set of problems.

Projection displays require very efficient and uniform luminance across the entire projected image. However, uniform luminance is typically difficult to achieve from the center to the corners of a projected display. Multiscreen displays exacerbate this problem because they employ an abutted array of display devices each displaying a subdivided portion of a total image, the multiple boundaries of which must appear as inconspicuous as possible. Unfortunately, when using projection displays in a multiscreen arrangement, it is especially difficult to achieve a visually seamless display because of the luminance and color nonuniformities that typically exist from screen to screen.

Indeed, even with highly uniform CRT displays, color and luminance shading variations in an individual display can degrade the total image displayed on a multiscreen display. For example, U.S. Pat. No. 5,396,257 for MULTISCREEN DISPLAY APPARATUS describes a CRT-based color and luminance sampling and correction system that corrects for shading differences in each display. The system employs an intelligent controller to coordinate luminance and color samples from each display and store correction data in lookup tables that are associated with each display, but which also account for the color and luminance of the overall multiscreen display. Even so, such CRT-based multiscreen displays still have problems including poor image stability, excessive weight and screen thickness, and image matching problems. Clearly, a digitally addressed, compact, light weight projection display would solve many of these problems, if only the luminance and uniformity problems could be solved.

Projection displays employing digitally addressed light valves have evolved to a point where many of the above problems can be solved. For example, "A 750-TV-Line-Resolution Projector Using 1.5-Megapixel a-Si TFT LC Modules," Takeuchi et al., Society for Information Display, SID 91 DIGEST, pp. 415–418, describes such a display. Unfortunately, the use of liquid crystal display ("LCD") panels as light valves has not been readily accepted for use in multiscreen projection display applications because of projection lamp-induced luminance and color variations.

In particular, LCD projectors employ a high efficiency light source, typically a metal halide arc lamp, housed in a reflector that directs as much of the light as possible toward the LCD. A parabolic reflector may be employed to produce a collimated beam of light or an elliptical reflector may be employed to produce a focused beam of light. However, either type of reflector produces a nonuniform distribution of light intensity that is brighter toward the center of the focused beam and dimmer towards the edges. The beam is also circular in shape, which causes a significant illumination loss around the edges of the typically rectangular LCD.

Prior workers have employed light homogenizers to help create more uniform illumination of the LCD. One approach employs a mirror tunnel to produce a kaleidoscope effect that randomizes the light rays. Another approach employs a series of micro lenses to project light onto the entire LCD from different regions of the incident light. However, these approaches inefficiently convert the substantially circular beam to the rectangular aperture of the LCD, which again results in a significant illumination loss around its edges.

What is still needed is a projection display having high luminance efficiency combined with luminance and color uniformity suitable for use in large screen display and multiscreen display applications.

SUMMARY OF THE INVENTION

An object of this invention is, therefore, to provide an apparatus and a method for efficiently converting a nonuniform light beam having a first cross-sectional shape into a uniform light beam having a second-cross-sectional shape.

Another object of this invention is to provide an apparatus and a method for improving the luminance, luminance uniformity, and color uniformity of a liquid crystal projection display.

Yet another object of this invention is to provide an apparatus and a method for improving the luminance, luminance uniformity, and color uniformity of a multiscreen liquid crystal projection display.

A projection display of this invention employs a fiber optic homogenizer that includes a bundle of optical fibers arranged such that an input end has a substantially round cross-sectional shape that receives nonuniform illumination generated by a projection light source. The fiber optic homogenizer contains optical fibers that are interwoven and rerouted through the length of the bundle to terminate in an output end having the same shape as a light valve that generates the image projected by the display. The interweaving and rerouting provides a substantially random redistribution of fibers across the shape of the output end to propagate a uniform, rectangular illumination beam onto the light valve with very little light loss.

A multiscreen projection display embodiment of this invention further matches the luminance and color of adjacent projection displays by employing a single projection light source and a fiber optic homogenizer that has an input end shaped and arranged as before, but with the bundle further subdivided into subbundles each terminating in an output end having a shape matched to a light valve in an associated one of the projection displays. The optical fibers are interwoven and routed to provide a subdivision and random redistribution of the fibers across the rectangular cross-sectional shape of each of the output ends. The random fiber redistributions propagate a uniform, rectangular illumination beam from each of the output ends that is uniformly imaged onto each light valve with very little light loss.

Additional objects and advantages of this invention will be apparent from the following detailed description of preferred embodiments thereof that proceed with reference to the accompanying drawings.

BRIEF DESCRIPTION OF THE DRAWINGS

FIG. 2 is a simplified block diagram of an LCD projection unit of this invention that is suitable for use in the multiscreen display system of FIG. 1.

FIG. 3 is a simplified pictorial view of a preferred embodiment of the lamp assembly shown in FIG. 2 employing a fiber optic homogenizer of this invention.

FIG. 4 is an input end view of the fiber optic homogenizer taken along lines 4—4 of FIG. 3.

FIG. 5 is an output end view of the fiber optic homogenizer taken along lines 5—5 of FIG. 3.

DETAILED DESCRIPTION OF PREFERRED EMBODIMENTS

Figure 1:
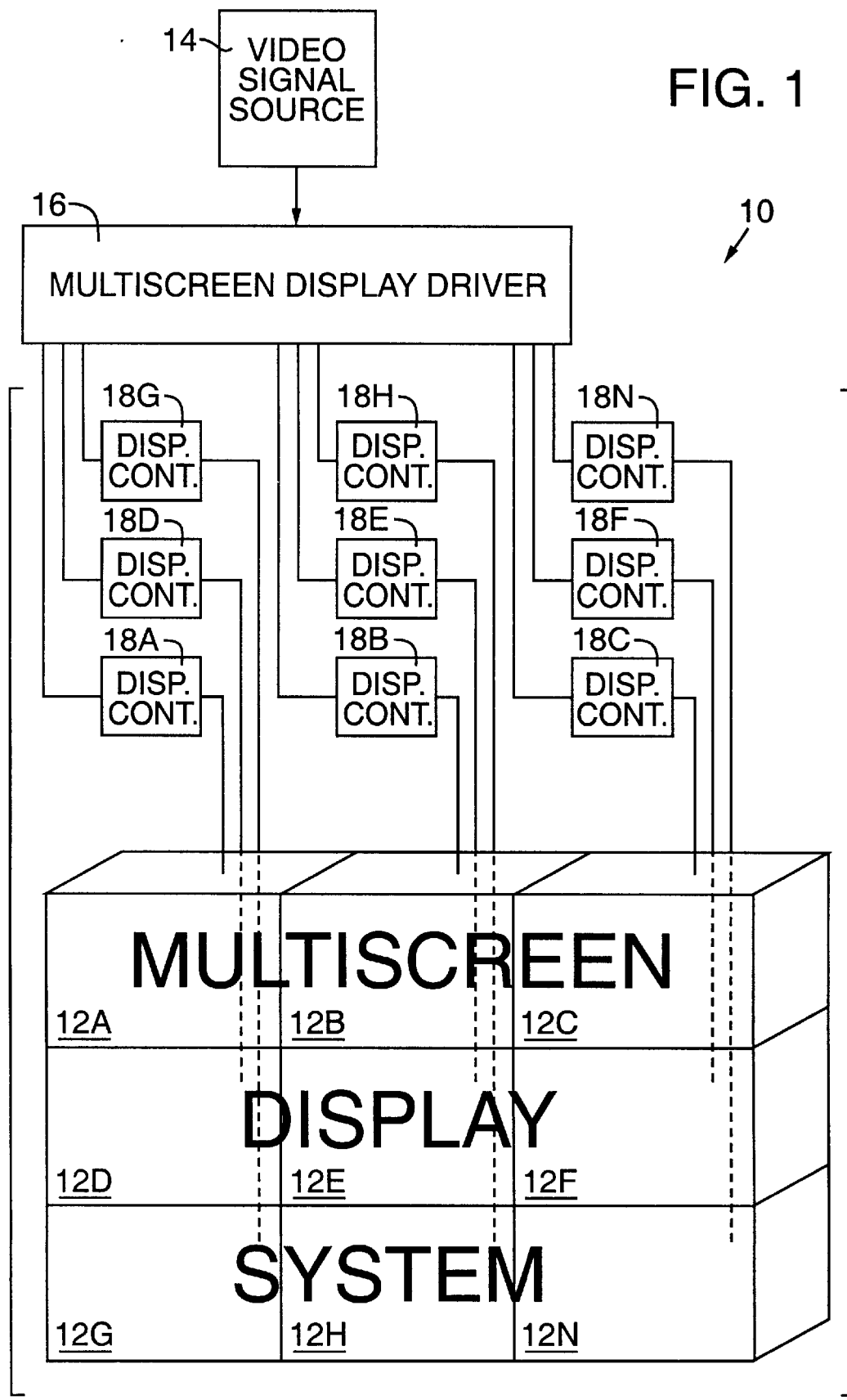
FIG. 1 is a simplified pictorial block diagram of a representative multiscreen display system suitable for use with this invention.

FIG. 1 shows a representative multiscreen display system 10 suitable for use with this invention. Multiscreen display system 10 employs a three-by-three array of LCD projection units 12A, 12B, . . . to 12N (collectively LCD projection units 12), in which N is as small as two and as big as practical to form a very large array of LCD projection units. Of course, this invention may also be employed in single screen LCD projection units. A conventional video signal source 14 drives a conventional multiscreen display driver 16, such as a model PICBLOC 3 display driver that is manufactured by Electrosonic Systems, Inc. of Minneapolis, Minn. Each of LCD projection units 12 are interconnected with multiscreen display driver 16 by associated display controllers 18A, 18B, . . . , to 18N, which perform LCD projection unit luminance and color balancing functions. Display controllers 18 are preferably integrated within projection units 12 and are described in copending U.S. patent application Ser. No. 08/740,966 for COLOR AND LUMINANCE CONTROL SYSTEM FOR LIQUID CRYSTAL PROJECTION DISPLAYS, which is assigned to the assignee of this application and which is incorporated herein by reference. Multiscreen display system 10 seamlessly displays a total image having a substantially uniform luminance and color balance.

As mentioned above, LCD projection displays have not been readily accepted for use in multiscreen display applications because they have lamp assembly-induced luminance and color variations and LCD optical path nonlinearities that make color balancing difficult.

FIG. 2 shows a representative one, for example 12N, of LCD projection units 12, which is suitable for use with this invention. LCD projection unit 12N includes two primary subsections: a lamp assembly 20 and an LCD assembly 22.

Lamp assembly 20 preferably includes a tungsten halogen or metal halide arc lamp 24 enclosed in an elliptical reflector 26 and housed in a cage assembly 28, all of which are cooled by a lamp fan 30. Arc lamp 24 is preferably a model L5341, 575 watt lamp manufactured by Hamamatsu Corporation located in Hamamatsu, Japan. Lamp assembly 20 further includes a fiber optic homogenizer 32 and a relay lens 34 that may have an optional integral ultraviolet/infrared ("UV/IR") filter such that LCD assembly 22 is supplied with a substantially uniform field of visible light. Fiber optic homogenizer 32 is described in more detail with reference to FIGS. 3–5.

Regarding luminance variations in lamp assembly 20, aging factors primarily include dimming over time of arc lamp 24 and degradation of coatings on elliptical reflector 26 and any optional UV/IR filter in relay lens 34. These aging factors reduce the overall luminance and change the color of the light reaching LCD assembly 22.

The lifetime rating of a typical tungsten halogen or metal halide arc lamp is based on the mean life of the lamp to 50 percent of its initial luminance. Moreover, the luminance of new lamps varies by as much as 20 percent. These two factors account for a possible 60 percent luminance variation between LCD projection units 12 in multiscreen display system 10.

LCD assembly 22 preferably includes input fresnel lens 36, an LCD array 40, and an output fresnel lens 42, all of which are cooled by an LCD fan 44. LCD array 40 is preferably a model LQ64P312 manufactured by Sharp Microelectronics located in Nara, Japan. LCD assembly 22 is optically coupled to lamp assembly 20 by an input fold mirror 46 and is optically coupled to a projection screen (not shown) by a projection lens 48 and fold mirrors 50 and 52.

Regarding color and light transmittance variations in LCD assembly 22, LCD array 40 manufacturing process and lot variations affect the transmitted luminance and color modulation of the light received from lamp assembly 20, thereby causing the luminance and color of the image on the projection screen to vary among projection units 12. LCD assembly 22 variations also occur over time because color filters and polarizers change with temperature and prolonged exposure to intense light. Temperature variations among LCD projection units 12 may also introduce color and luminance variations. However, these variations account for less than about a 5 percent difference in luminance and considerably less in color.

Accordingly, the most significant improvements in luminance efficiency, luminance uniformity, and color balance are achieved by improving lamp assembly 20. In particular, fiber optic homogenizer 32 provides more efficient and uniform illumination to LCD assembly 22 than prior homogenizers.

FIGS. 3, 4, and 5 show a first preferred embodiment of fiber optic homogenizer 32 that includes a bundle 60 of optical fibers 62 arranged such that an input end 64 has a substantially round cross-sectional shape with about a 0.75 inch diameter that is positioned to intercept most or all of the focused illumination generated by arc lamp 24 and elliptical reflector 26. Input end 64 receives from elliptical reflector 26 a nonuniform substantially round illumination profile that is brighter toward the center and dimmer toward the edge of input end 64.

FIG. 4 identifies representative ones of fibers located generally toward the center of input end 64 as fibers A, fibers located generally toward the edge of input end 64 as fibers C, and fibers located generally between the center and edge of input end 64 as fibers B. Fiber optic homogenizer 32 preferably contains a roughly equal mix of about 800, 0.020 inch diameter optical fibers A, B, and C that are interwoven and rerouted through the length of bundle 60 to terminate in an output end 66 having substantially the same shape, i.e., rectangular, as LCD array 40. Bundle 60 should be sized to capture most of the light reflected from elliptical reflector 26. More than the above-described three groups of fibers may be employed for a more precise redistribution of the light.

FIG. 5 shows that the interweaving and rerouting preferably provides a substantially random redistribution of fibers A, B, and C across the rectangular cross-sectional shape of output end 66 of homogenizer 32. The random fiber redistribution propagates a uniform, rectangular illumination beam from output end 66 that is uniformly imaged onto LCD array 40 by relay lens 34 with very little light loss.

Alternatively, the input and output ends of homogenizer 32 may be shaped to match a variety of light source and light receptor shapes having a corresponding number of source and receptor illumination profiles. For example, the fiber redistribution could be biased to provide slightly more light toward the edges or corners of the homogenizer output end to compensate for the typically larger attenuation along the edges or corners of an optical path. Moreover, the input end may have an elongated shape adaped to match the elongated illumination from a light source having an elongated filament.

Figure 6:
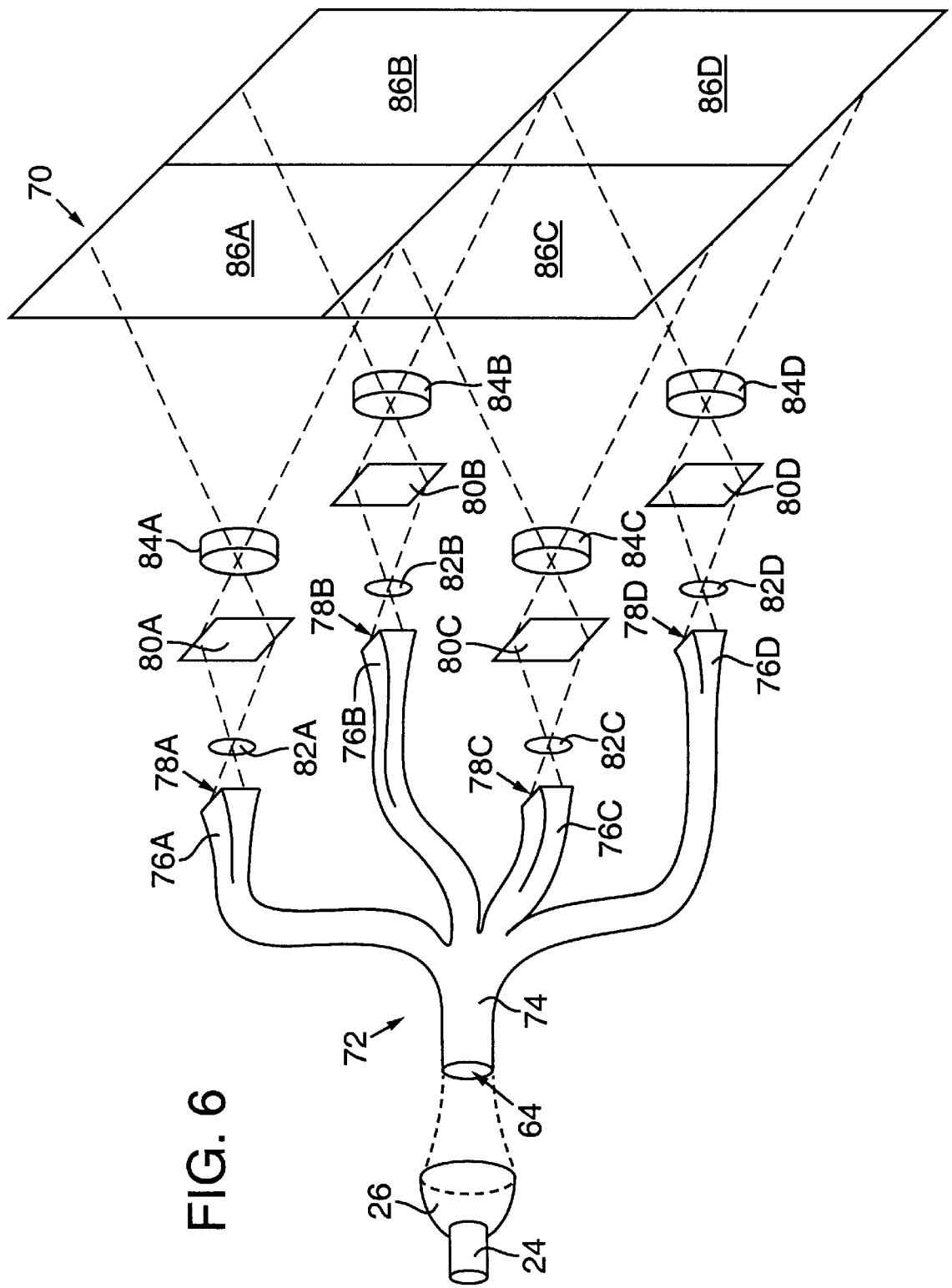
FIG. 6 is a simplified pictorial view of a multiscreen projection display system employing a single lamp and reflector and a single-input-to-four-output fiber optic homogenizer embodiment of this invention.

FIG. 6 shows a second preferred embodiment of this invention that further matches the luminance and color of adjacent projection displays in a multiscreen display 70, such as a videowall. In prior multiscreen applications, each projector has its own lamp assembly. For example, in a four screen projection display, four separate lamps are used, each having a potentially different luminance, luminance profile, and color temperature, requiring additional circuitry and complexity to match the liminance and color of the adjacent displays. The luminance and color matching problem is compounded over time by the varying aging characteristics of each lamp.

The luminance and color matching problem is solved in multiscreen display 70 by using a single lamp assembly including arc lamp 24 and elliptical reflector 26 as before. In the second embodiment, a fiber optic homogenizer 72 has a bundle 74 with input end 64 shaped and arranged substantially the same as in fiber optic homogenizer 32. However, bundle 74 is subdivided into four subbundles 76A, 76B, 76C, and 76D (collectively "subbundles 76") having respective output ends 78A, 78B, 78C, and 78D (collectively "output ends 78"). As in FIG. 4, fiber optic homogenizer 72 preferably contains a roughly equal mix of about 800, 0.020 inch diameter optical fibers A, B, and C that are interwoven and rerouted through the lengths of bundle 74 and subbundles 76 to terminate in output ends 78 having substantially the same shape, i.e., rectangular, as associated LCD arrays 80A, 80B, 80C, and 80D.

In fiber optic homogenizer 72, the interweaving and rerouting preferably provide a subdivision and redistribution of fibers A, B, and C such that about 200 of the fibers are randomly distributed across the rectangular cross-sectional shape of each of output ends 78. The random fiber redistributions propagates a uniform, rectangular illumination beam from each of output ends 78 that is uniformly imaged onto associated LCD arrays 80 by associated relay lenses 82A, 82B, 82C, and 82D with very little light loss. This embodiment has the additional benefit of producing at each of output ends 78 a smaller cross-sectional uniform illumination profile, which is more easily and efficiently imaged by relay lenses 82 on LCD arrays 80.

Light transmitted by each of LCD arrays 80 is focused through associated projection lenses 84A, 84B, 84C, and 84D onto projection screens 86A, 86B, 86C, and 86D. The four projected images are carefully aligned so their edges are adjacent to produce a visually seamless total image having an overall uniform illumination and color matching among projection screens 86. Because a single light source (arc lamp 24 and elliptical reflector 26) is employed, the overall illumination and color matching among projection screens 86 is maintained over the life of arc lamp 24. A further advantage of this embodiment is that a large aperture light source may be used, which typically results in a longer lamp life and a more efficient light source because of a larger arc. The large aperture light source is converted into multiple, bright, small aperture light sources that are more optimally suited for imaging through relay lenses 82 and onto LCD arrays 80.

Skilled workers will recognize that portions of this invention may be implemented differently from the implementations described above. For example, the fiber optic homogenizers are not limited to single-ended or four-ended embodiments, color and monochrome embodiments equally applicable, other than LCD light valves may be employed, and various other fold mirror and optical combinations may be employed in the projection displays. The invention is also useful for redistributing a uniform light source into a single light source or multiple light sources each having a predetermined illumination profile and cross-sectional shape. Moreover, embodiments of this invention are envisioned in which multiple light sources may be focused to a single or multiple homogenizer ends and distributed via direct or optical coupling to single or multiple light valves. Of course, a multiscreen projection display may be made by employing an array of projection displays each having a separate light source coupled to a light valve by a fiber optic homogenizer having single input and output ends.

It will be obvious to those having skill in the art that many changes may be made to the details of the above-described embodiments of this invention without departing from the underlying principles thereof. Accordingly, it will be appreciated that this invention is also applicable to light distribution applications other than those found in projection displays. The scope of the present invention should, therefore, be determined only by the following claims.

I claim:

1. In an image projection system, an apparatus for producing from a light source having a nonuniform source illumination profile distributed across a first cross-sectional shape a predetermined illumination profile across an image forming device having a second cross-sectional shape, comprising:

a bundle of light propagating fibers having an input end with substantially the first cross-sectional shape receiving from the light source the nonuniform source illumination profile and having an output end with substantially the second cross-sectional shape, the first cross-sectional shape being different than the second cross-sectional shape and the light propagating fibers following rearranged pathways within the bundle so as to propagate to the image forming device the predetermined illumination profile distributed across the second cross-sectional shape.

2. The apparatus of claim 1 in which the image forming device is subdivided into a number of image forming devices and the bundle of light propagating fibers is subdivided into a corresponding number of output ends.

3. The apparatus of claim 2 in which each of the image forming devices has substantially the second cross-sectional shape and receives the predetermined illumination profile.

4. The apparatus of claim 3 in which each of the output ends has substantially the second cross-sectional shape and propagates to an associated one of the image forming devices the predetermined illumination profile.

5. The apparatus of claim 3 in which the second cross-section shape is substantially rectangular.

6. The apparatus of claim 2 in which each of the image forming devices is a light valve.

7. The apparatus of claim 6 in which the number of image forming devices is four and each light valve is a liquid crystal display panel.

8. The apparatus of claim 2 in which the bundle of light propagating fibers has an input end diameter of about 0.75 inches including about 800 fibers each having a diameter of about 0.020 inches, and each of the subdivided output ends includes a correspondingly subdivided number of the fibers.

9. The apparatus of claim 1 in which the light source includes an elliptical reflector.

10. The apparatus of claim 9 in which the light valve includes a liquid crystal display panel.

11. The apparatus of claim 1 in which the source illumination profile is nonuniform and the first cross-section shape is substantially circular.

12. The apparatus of claim 1 in which the second cross-section shape is substantially rectangular.

13. The apparatus of claim 1 in which the light source includes at least one metal halide arc lamp.

14. The apparatus of claim 1 in which the image forming device includes a light valve.

15. The apparatus of claim 1 in which the bundle of light propagating fibers has an input end diameter of about 0.75 inches and includes about 800 fibers each having a diameter of about 0.020 inches.

16. An apparatus for producing a predetermined illumination profile, comprising:

multiple light sources each producing a first illumination profile distributed across a first cross-sectional shape;

at least one light receptor requiring the predetermined illumination profile distributed across a second cross-sectional shape; and a bundle of light propagating fibers having multiple input ends each with substantially the first cross-sectional shape receiving from an associated one of the multiple light sources the first illumination profile and having at least one output end with substantially the second cross-sectional shape, the light propagating fibers following rearranged pathways within the bundle so as to propagate to the at least one light receptor the predetermined illumination profile distributed across the second cross-sectional shape.

17. The apparatus of claim 16 in which each of the light receptors has substantially the second cross-sectional shape and receives the predetermined illumination profile.

18. The apparatus of claim 17 in which the second cross-section shape is substantially rectangular.

19. The apparatus of claim 17 in which the predetermined illumination profile is a substantially uniform illumination profile.

20. The apparatus of claim 17 in which each of the light receptors is a light valve in a projection display.

21. The apparatus of claim 16 in which the at least one light receptor includes a light valve in a projection display.

22. The apparatus of claim 21 in which the light valve includes a liquid crystal display panel.

23. The apparatus of claim 16 in which the first illumination profile is nonuniform and the first cross-section shape is substantially circular.

24. The apparatus of claim 16 in which the second cross-section shape is substantially rectangular.

25. The apparatus of claim 16 in which the predetermined illumination profile is a substantially uniform illumination profile.

26. The apparatus of claim 16 in which the multiple light sources includes at least one metal halide arc lamp.

27. The apparatus of claim 16 in which the multiple light sources include at least one elliptical reflector.

* * * * *